United States Patent [19]

Oliver, Jr.

[11] Patent Number: 4,814,869
[45] Date of Patent: Mar. 21, 1989

[54] VIDEO SURVEILLANCE SYSTEM

[76] Inventor: Robert C. Oliver, Jr., 239 E. Kingsbridge Rd., N.Y.C., N.Y. 10458

[21] Appl. No.: 43,211

[22] Filed: Apr. 27, 1987

[51] Int. Cl.[4] .............................................. H04N 7/18
[52] U.S. Cl. ....................................... 358/108; 358/86
[58] Field of Search ...................... 358/108, 86, 191.1, 358/193.1, 194.1

[56] References Cited

U.S. PATENT DOCUMENTS

| | | | |
|---|---|---|---|
| 3,105,873 | 10/1963 | Winston | 358/86 |
| 3,423,521 | 1/1969 | Friesen | 358/86 |
| 4,249,206 | 2/1981 | Roscoe | 358/108 |
| 4,511,886 | 4/1985 | Rodriguez | 358/108 |
| 4,630,110 | 12/1986 | Cotton | 358/108 |
| 4,649,428 | 3/1987 | Jones | 358/194.1 |
| 4,651,143 | 3/1987 | Yamanara | 358/108 |
| 4,673,974 | 6/1987 | Ito | 358/86 |

Primary Examiner—Howard W. Britton
Attorney, Agent, or Firm—Klein & Vibber

[57] ABSTRACT

A video surveillance system is disclosed in which modulated signals from a plurality of video cameras are multiplexed onto a single path capable of carrying for example up to 36 video channels. One or more such communication paths are provided to a signal splitter which provides the paths to one or more video screens and tuners. The tuners are operated under computer control so as to sequence the display of information from the different video cameras. Advantageously, structure is also provided for recording the video display on a VCR when a display includes matters of interest. The computer is also responsive to alarm inputs to display on one or more screens the signals from video cameras in the area adjacent the alarm.

17 Claims, 2 Drawing Sheets

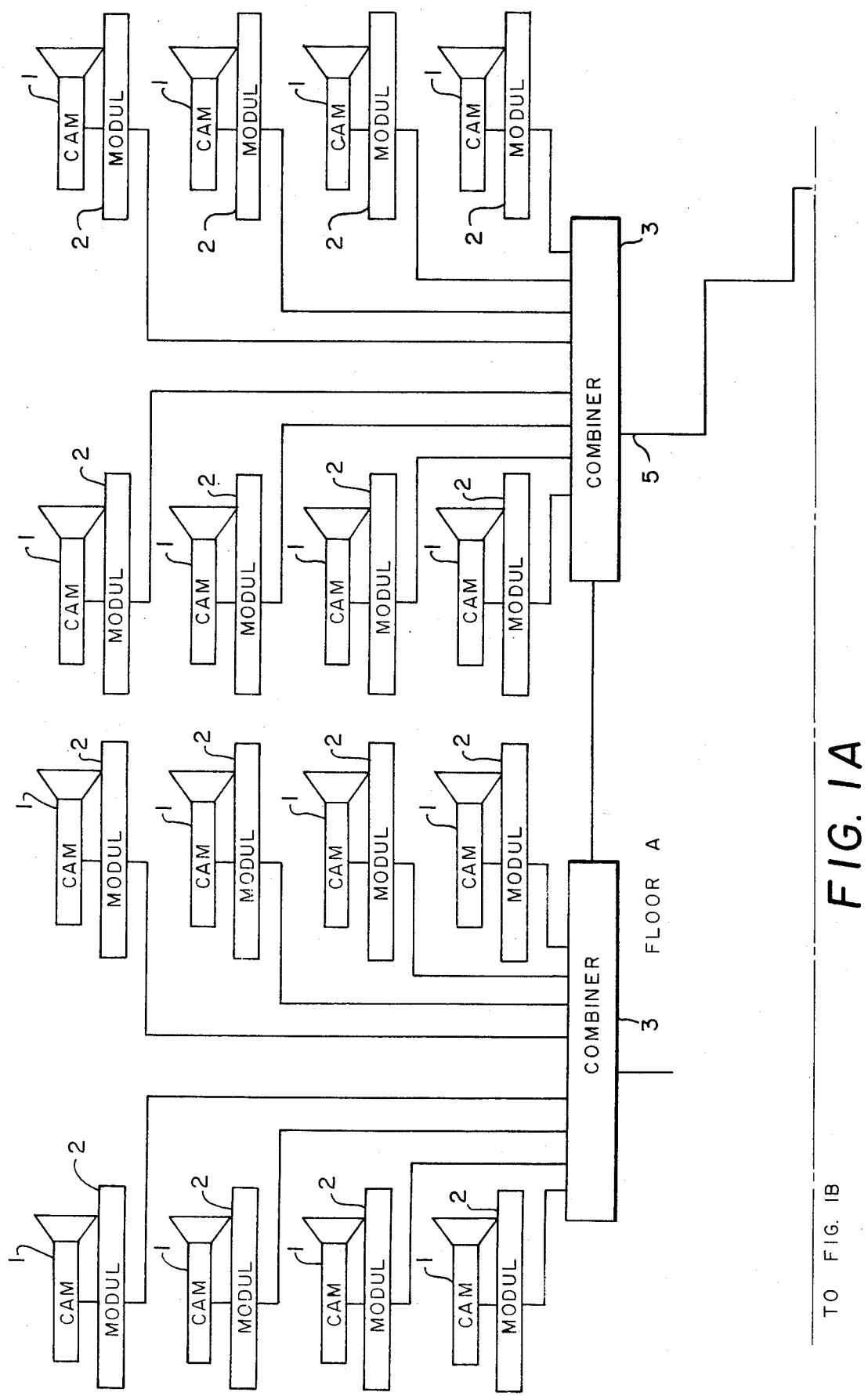

VIDEO SURVEILLANCE SYSTEM

BACKGROUND OF THE INVENTION

This invention relates to a video surveillance system and, in particular, to one using multiple cameras and one or more video screens to display the fields of view of the cameras. typically, video surveillance systems provide video cameras at appropriate locations throughout the facility to be guarded. Each camera is then wired directly to a control console at which the video signal is displayed. Such systems, however, incur substantial wiring costs and limited flexibility.

SUMMARY OF THE INVENTION

In the present invention, modulated signals from a plurality of video cameras are multiplexed onto a single path or cable capable of carrying, for example, up to 36 video channels. One or more such communication paths are provided to a signal splitter which provides the paths in parallel to each of a plurality of video screens and tuners. The tuners are operated under computer control so as to sequence on the screens the display of information from the different video cameras. Advantageously, means are also provided for recording the video display on a VCR when a display includes matters of interest.

In a preferred embodiment of the invention, the computer is also responsive to alarm inputs to display on one more more screens the signals from video cameras in the vicinity of the alarm.

BRIEF DESCRIPTION OF THE DRAWINGS

A preferred embodiment of the invention is described below in which.

DETAILED DESCRIPTION OF THE INVENTION

Figure 1B:
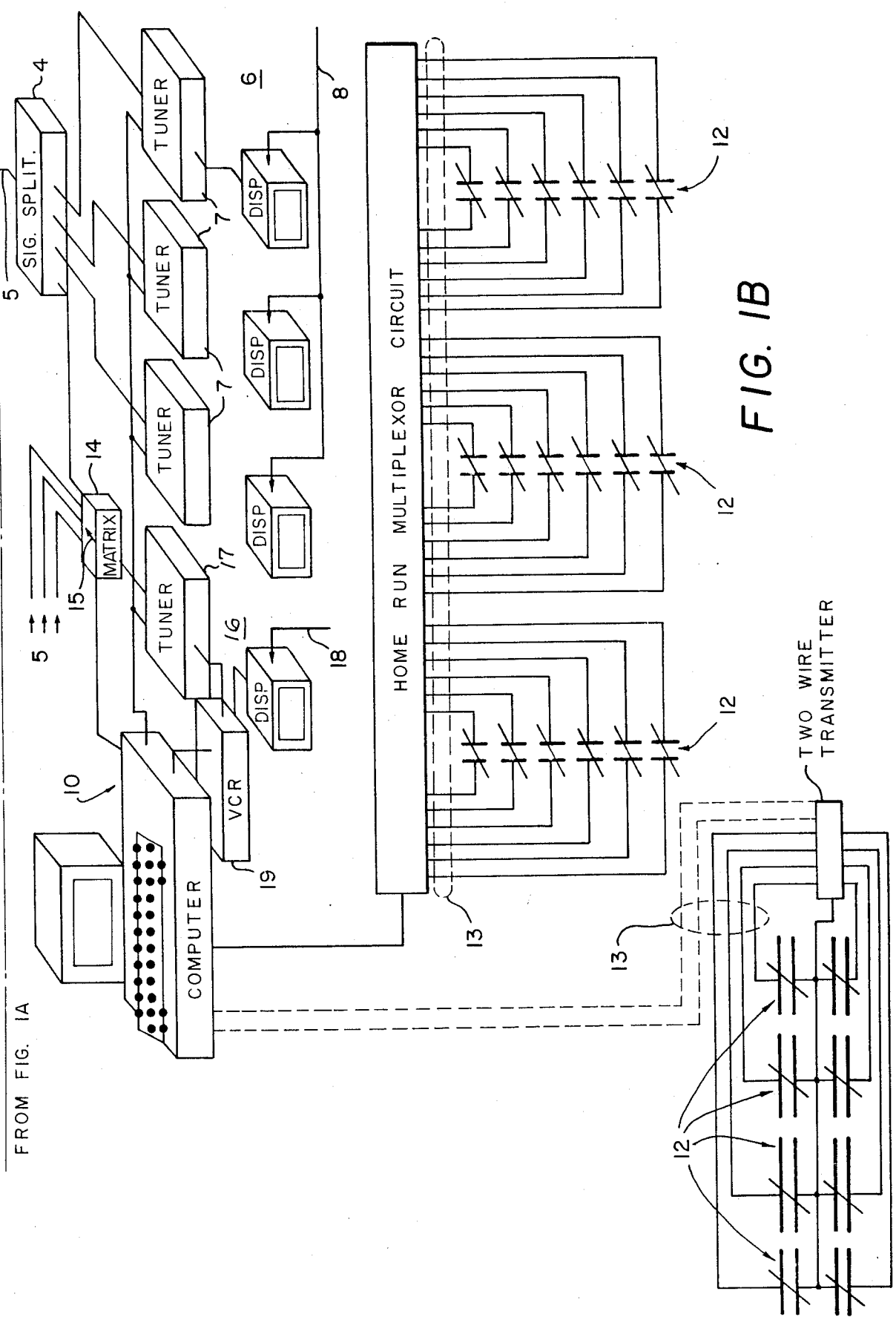
FIG. 1 is a schematic drawing of the preferred embodiment of the invention.

As shown in FIG. 1, the system of the present invention comprises a plurality of video cameras 1, each of which is connected to a video modulator 2, each of which is connected in turn to a video frequency multichannel combiner 3. Each modulator modulates signals from the camera to which it is connected to a unique channel frequency and provides an output video signal to combiner 3 which combines the signals from all the modulators onto a single video transmission path 5. A plurality of such combiners are connected together in series so as to supply signals to a signal splitter 4 via video transmission path 5. Illustratively, the video transmission path has capacity for 35 channels, and therefore can accommodate 36 video cameras. If desired, additional video transmission paths 5 may also be applied to signal splitter 4 from other video cameras (not shown).

The signal splitter supplies the signals received from the video transmission path or paths to a plurality of video displays 6 each of which comprises a tuner 7 and a display screen 8. Depending on the channel selected by a tuner 7, display screen 8 will display whatever is within the field of view of the video camera 1 whose signal is transmitted on the channel selected by the tuner.

In accordance with the invention, a computer 10 controls the tuner 7 so as to sequence the displays on screen 8 through what is seen by a series of cameras 1. For example, the computer might control the tuner of one video display so that its screen displays in succession a series of views that might be encountered as one walked through a floor or a building.

As shown in FIG. 1, more than one video display is connected in parallel to path 5, for example, to provide displays from different sequences of cameras or increased surveillance of especially critical areas. Alternatively, each video display 6 could be connected only to one transmission path 5.

Further in accordance with the invention, the system includes one or more alarm inputs 12, such as fire alarms or break-in alarms, which are connected to the computer by transmission wires 13, one or more switching matrices 14, and one or more video displays 16 connected in parallel to at least one of video displays 6. Switching matrix 14 illustratively is a rotary switch. Each display 16 comprises a tuner 17, a display screen 18 and a video recorder (VCR) 19.

In response to a signal from an alarm input, computer 10 identifies the region from which the alarm comes and switches a wiper arm 15 of switching matrix 14 to the video path 5 that comes from the cameras in this area. It also identifies one or more cameras adjacent the alarm input, ascertains their channel frequencies, and user tuners 17 to tune one or more video displays to the channel frequencies associated with these video cameras. Advantageously, it also activates a VCR 19 connected to each video display so as to record the display during the alarm condition.

The components of the system of FIG. 1 are generally available. Video cameras 1, for example, may be RCA: TC-2011, modulators 2 may be the MVM modulator available from Blonder-Tongue, combiner 3 may be Minicircuits: 2FSC-12-1-75 video display 6 may be a conventional TV set preferably with an electronic remote control tuner which may, for example, be modified as indicated in conjunction with FIG. 2.

Computer 10 illustratively is a personal computer such as an IBM-PC or a clone. To control the tuners and switching matrix, the computer maintains in its memory several lists. A first list associates each video camera 1 with its channel frequency and its transmissions path 5. A second list associates each alarm input with one or more cameras that observe areas that would be of interest if the alarm were to be activated. A third list specifies for each video display the sequence of video cameras whose signals are to be displayed thereon. Advantageously, this list also specifies the duration of display of the field of view of each video camera. Each of these lists can be entered into the memory of the computer from the computer keyboard and can be updated as conditions change.

In operating the system, the three lists are entered into computer memory and the system begins to control tuners 7 of each video display 6. To do this, the computer reads from the third list the identity of the first camera whose signals are to be displayed on a first video display. It then uses the identification of the first camera to read from the first list parameters specifying the channel frequency on which signals from that camera are transmitted and it uses these parameters to tune tuner 7 of the first video display to that channel frequency. The computer then repeats these steps to provide to each of the other video displays 6 signals from the first camera specified in the third list that are to be displayed on each of those displays. It then repeats these steps for each additional camera specified on the display list for each video display.

This process continues endlessly with the computer continuing to cycle its way through the display lists. While doing this, the computer also monitors the alarm inputs. If an alarm input is received, the computer uses the identity of one or more cameras in the vicinity of the alarm or whose input has been determined to be useful in the event of an alarm. The computer then uses the identity of each camera to read from the first list parameters specifying its channel frequency and the identity of its transmission path 5. The path identity is used by the computer to set switching matrix or matrices 14 so as to connect that path to tuners 17 of video displays 16; and the parameters specifying the channel frequencies to display signals from the cameras of interest. Advantageously, the computer also activities VCRs 19 of each video display to record high resolution signals from these cameras during the alarm event.

Figure 2A:
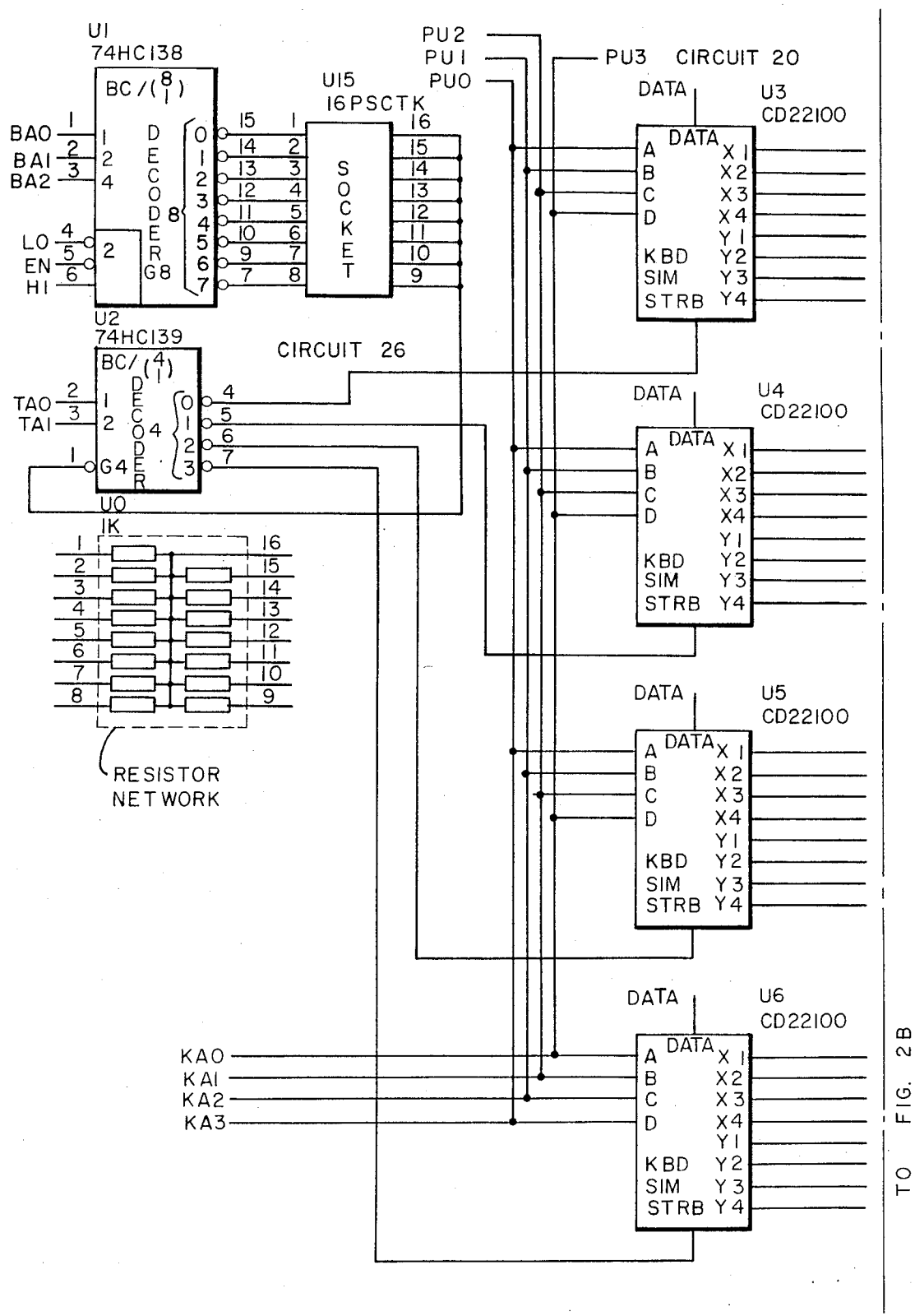
FIG. 2 is a block diagram of circuitry used in the practice of the invention.
Figure 2B:
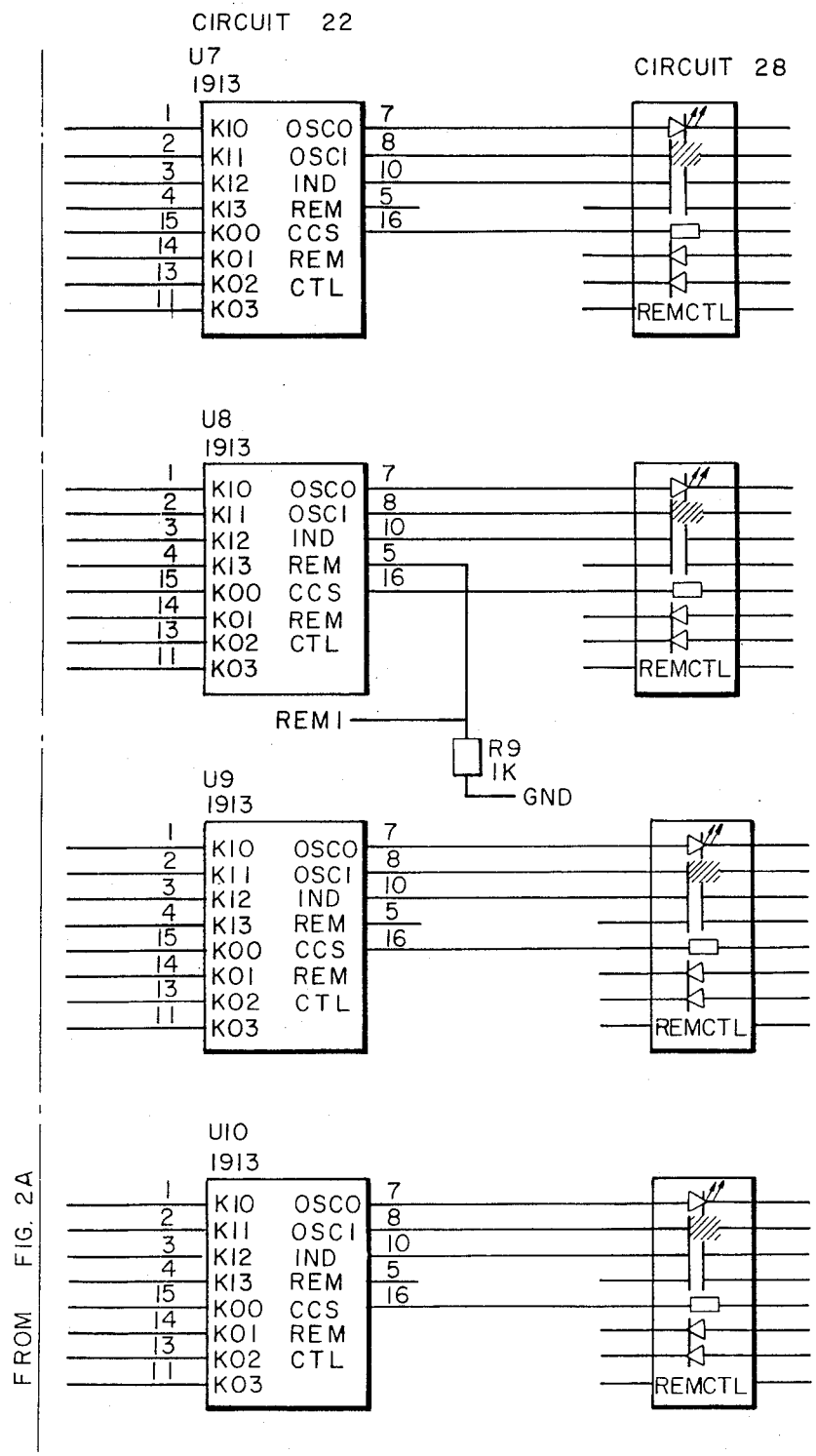

Advantageously, tuners 7 and 17 are controlled by computer 10 by a circuit 20 shown in FIG. 2 that is similar to a remote control tuner circuit of a conventional TV. The remote control unit of a conventional TV includes a keyboard, a keyboard encoder circuit and a remote control chip such as an NEC uPD1913C. The keyboard encoder generates signals representative of the key that is depressed on the keyboard and provides these signals to the remote control chip. The remote control chip uses these signals to generate a unique pulse train that is provided to an infrared light emitting diode that transmits the pulse train as infrared pulses to an infrared detector at the TV set. The optical pulse train received by the infrared detector is converted to an electrical pulse train and this pulse train is received by the tuner circuit in the TV and used to set the tuner to the desired channel frequency.

As shown in FIG. 2, circuit 20 comprises a plurality of keyboard simulators 22, a plurality of remote control circuits 24, a strobe circuit 26 and a plurality of component carriers 28 that carry passive elements conventionally used in the generation of output signals from circuits 24. The keyboard simulators illustratively are RCA CD22100 circuits and the remote control circuits are NECuPD1913C integrated circuits. Circuit 20 as shown in FIG. 2 the REM output from each circuit 24. Obviously, other numbers of tuners can be controlled by varying the number of circuits 22, 24, 28.

The channel frequency information that is stored in the first list in the computer is a different pattern of bits for each different channel to be selected. Upon reading such a bit pattern from the first list, the computer supplies this pattern to signal lines KAO–KA3. Signals on these four lines can be used to select any one of sixteen different video channels. More lines can be used to select additional channels. Strobe circuit 26 determines which keyboard simulator 22 decodes this pattern to produce an output on one of lines X1–X4 and one of lines Y1–Y4 that uniquely identifies the bit pattern. These signals represent the depression of a key on a remote control channel tuner. The signals are provided to remote control tuner circuit 24 where they are used to generate a pulse train at the REM output that would ordinarily be used to pulse a light emitting diode. However, in the present invention, the pulse train is provided by a wire connection directly to the video display 6 where it is connected to the output signal line (not shown) from the infrared light detector that would ordinarily receive infrared light pulses from the remote control tuner. A resistor R9 in FIG. 2 is used to adjust signal amplitudes so that the signal on the light-detector output is comparable in magnitude to what would be present if the infrared transmission were operating.

As will be evident to one skilled in the art, numerous variations may be made in the practice of the invention without departing from its spirit and scope. The transmission paths may be coaxial cables, microwave signals or any other communication channel suitable for the transmission of video signals. The locations of the cameras could be close together in a relatively small area, dispersed throughout a building or buildings, or even in widely scattered areas throughout the world. The cameras may be stationary or mobile. Advantageously, one or more cameras might be mounted in movable robots. If desired, audio input could also be provided at each camera. The applications of the invention are myriad. In addition to ordinary video surveillance, the invention may also be used for example in controlling access to secured areas.

What is claimed is:

1. A video surveillance system comprising:
   a plurality of video cameras,
   means for modulating signals from each camera,
   means for multiplexing said modulated signals onto a path capable of carrying a plurality of video channels,
   a signal splitter which provides the signals on said path in parallel to a plurality of video displays each comprising a tuner and a display screen, and
   a computer connected to said tuners and comprising means for controlling at least one of said tuners so as to display on its display screen a sequence of images from different video cameras.

2. The surveillance system of claim 1 further comprising:
   a plurality of alarm signal generators,
   means for connecting said alarm signal generators to said computer, and
   means in said computer responsive to an alarm from an alarm signal generator for controlling at least another one of said tuners so as to display on its display screen an image from a video camera near the alarm signal generator that generates said alarm.

3. The surveillance system of claim 1 wherein means are provided for recording the display of information on the display screen.

4. In a predetermined surveillance area, a video surveillance system comprising:
   a plurality of surveillance video cameras, stationed at predetermined surveillance points;
   each of said cameras having a video output and being provided with means for modulating said video output at a predetermined frequency band;
   a signal path capable of carrying a plurality of modulated signals at different frequency bands;
   each of said modulating means being provided with connection means for connecting said modulating means to said signal path;
   a surveillance control station, said control station comprising
   selectable tuner means, demodulating means, and video display means, said tuner means being connected to said signal path, and said demodulating means being connected from said tuner means to said display means whereby adjustment of said selectable tuner means selects one of said predetermined frequency bands for demodulation and display on said video display means, thereby displaying on said video display means a selected surveillance point; and a sequencing means, said sequencing means being provided with means for adjusting said selectable tuner so as to select one of said predetermined frequency bands, said sequencing correlating each of said predetermined frequency bands with a corresponding one of said surveillance points whereby the video signal generated by the camera at any surveillance point can be rapidly displayed on said video display means, said sequencing means also associating a time interval with each of said frequency bands and having means for arranging an order of frequency bands such that the video signal from each surveillance point can be displayed on said video display means in a predetermined order for a predetermined duration.

5. A video surveillance system as claimed in claim 4, further comprising
a plurality of selectable tuner means, demodulating means, and video display means, connected to said signal path, whereby a plurality of surveillance points can be displayed simultaneously.

6. A video surveillance system as claimed in claim 4, further comprising
a plurality of alarm signal generators stationed at predetermined security points, at least one security point corresponding to one of said surveillance points;
means for connecting said alarm signal generators to said sequencing means;
said sequencing means being provided with means responsive to said alarm signal generators and means for associating said alarm signal generator at a security point corresponding to one of said surveillance points with a frequency band corresponding to said surveillance point, whereby upon generation of an alarm signal by an alarm signal generator at a security point corresponding to one of said surveillance points, the video signal from the video camera stationed at said surveillance point is displayed on said display means.

7. A video surveillance system as claimed in claim 4, further comprising
said sequencing means being provided with input means for accepting information associating each of said surveillance points with a frequency band and associating each frequency band with a priority and a time interval, whereby a user can configure the control station to display the video signals associated with surveillance points in any order and for any duration selectable by the user.

8. A video surveillance system as claimed in claim 4, further comprising
video recording means for recording a signal displayed on said display means, said sequencing means being provided with means for controlling said recording means.

9. A video surveillance system as claimed in claim 4, further comprising
a plurality of signal paths, each path capable of carrying N number of modulated signals and each path being connected to up to N number of video cameras stationed at predetermined surveillance points, each camera being provided with modulating means for modulating said video output at one of N different frequency bands;
a plurality of selectable tuner means, the number of tuner means corresponding to the number of signal paths, each tuner means being connected to one of said signal paths and being capable of selectably tuning each modulated signal generated by the modulating means connected to the same signal path as the tuner;
selectable switching means for connecting each one of said tuners to said video display means;
said sequencing means being provided with means for controlling said switching means and means for associating each surveillance point with a frequency band and a signal path, whereby the number of surveillance points displayable on said display means may be increased in increments up to N number.

10. A video surveillance system as claimed in claim 5, further comprising
each signal path being connected to a plurality of selectable tuner means, demodulating means, and video display means, whereby a plurality of surveillance points connected to each signal path can be displayed simultaneously.

11. A video surveillance system as claimed in claim 5, further comprising
a plurality of alarm signal generators stationed at predetermined security points, at least one security point corresponding to one of said surveillance points;
means for connecting said alarm signal generators to said sequencing means;
said sequencing means being provided with means responsive to said alarm signal generators and means for associating said alarm signal generator at a security point corresponding to one of said surveillance points with a frequency band and a signal path corresponding to said surveillance point, whereby upon generation of an alarm signal by an alarm signal generator at a security point corresponding to one of said surveillance points, the video signal from the video camera stationed at said surveillance point is displayed on said display means.

12. A video surveillance system as claimed in claim 5, further comprising
said sequencing means being provided with input means for accepting information associating each of said surveillance points with a frequency band and a signal path and associating each frequency band with a priority and a time interval, whereby a user can configure the control station to display the video signals associated with surveillance points in any order and for any duration selectable by the user.

13. A video surveillance system as claimed in claim 5, further comprising
video recording means for recording a signal displayed on said display means, said sequencing means being provided with means for controlling said recording means.

14. A method of video surveillance comprising the steps of
positioning a video camera at each of N number of preselected surveillance points;

providing each video camera with a modulator for modulating the output of each camera at one of N number of different frequency bands;

providing a first signal path capable of carrying N number of modulated signals in such a way that the first signal path extends in a circuit covering every one of said N number of surveillance points;

connecting each one of the N number of modulators to said first signal path;

choosing a monitoring point along said first signal path for a monitoring station;

providing a monitoring station with a selectable first tuner capable of tuning each of said N number of frequency bands and connecting said selectable first tuner to said first signal path at said monitoring point;

providing said monitoring station with a video display device and connecting said display device to said first tuner;

associating each of said N number of frequency bands with one of said surveillance points;

adjusting said first tuner to select a frequency band associated with the surveillance point to be dispalyed.

15. A method of video surveillance as claimed in claim 14 further comprising the comprising the steps of associating a time interval with each of said N number of frequency bands;

ordering said N number of frequency bands in a sequence; and adjusting said first tuner to select each of said frequency bands in said sequence and displaying each associated surveillance point on said video dispaly for a duration equal to the time interval associated with the frequency band associated with said surveillance point.

16. A method of video surveillance as claimed in claim 14 further comprising the comprising the steps of positioning a video camera at each of an additional M number of additional preselected surveillance points;

providing each video camera at each additional surveillance point with a modulator for modulating the output of the camera at one of M number of different frequency bands;

providing a second signal path capable of carrying M number of modulated signals in such a way that the second signal path extends in a circuit covering every one of said M number of additional surveillance points and said monitoring point;

connecting each one of the M number of modulators to said second signal path;

providing said monitoring station with a second selectable tuner capable of tuning each of said M number of frequency bands and connecting said selectable tuner to said second signal path at said monitoring point;

connecting switching means between said first and second tuner and said display device;

associating each of said M number of frequency bands with one of said additional surveillance points;

associating each of said M number of additional surveillance points with said second signal path and associating each of sand N number of surveillance points with said first signal path;

adjusting said switching means and said tuners to select a frequency band and a signal path associated with the surveillance point to be dispalyed.

17. A method of video surveillance as claimed in claim 16 further comprising the comprising the steps of associating a time interval with each of said M number of frequency bands;

ordering said N and M number of surveillance points in a sequence; and adjusting said tuners and said switching means to select each of said frequency bands and said signal paths in said sequence and displaying each associated surveillance point on said video dispaly for a duration equal to the time interval associated with the frequency band and signal path associated with said surveillance point.

* * * * *